United States Patent
Yao et al.

(10) Patent No.: US 9,386,060 B2
(45) Date of Patent: Jul. 5, 2016

(54) PROCESSING OVER-THE-TOP CONTENT FOR IMPROVED INITIAL DELIVERY

(71) Applicant: Verizon and Redbox Digital Entertainment Services, LLC, Basking Ridge, NJ (US)

(72) Inventors: Xuefeng Yao, Weston, MA (US); Jian Huang, Sudbury, MA (US); Jianxiu Hao, Lexington, MA (US); Okeno Palmer, Woburn, MA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 261 days.

(21) Appl. No.: 14/062,226

(22) Filed: Oct. 24, 2013

(65) Prior Publication Data

US 2015/0120875 A1 Apr. 30, 2015

(51) Int. Cl.
- G06F 15/16 (2006.01)
- H04L 29/06 (2006.01)
- H04N 21/262 (2011.01)
- H04N 21/231 (2011.01)

(52) U.S. Cl.
CPC ............ H04L 65/60 (2013.01); H04L 65/4084 (2013.01); H04N 21/231 (2013.01); H04N 21/23116 (2013.01); H04N 21/26258 (2013.01)

(58) Field of Classification Search
CPC combination set(s) only.
See application file for complete search history.

(56) References Cited

U.S. PATENT DOCUMENTS

| | | | | |
|---|---|---|---|---|
| 8,826,347 | B1* | 9/2014 | Earle | H04N 21/4825 725/109 |
| 9,009,764 | B2* | 4/2015 | Walker | H04N 21/44204 370/310 |
| 9,124,937 | B2* | 9/2015 | Stern | H04N 21/478 |
| 2013/0132986 | A1* | 5/2013 | Mack | H04L 65/605 725/14 |
| 2013/0219023 | A1* | 8/2013 | Surianarayanan | H04W 4/22 709/219 |
| 2013/0276017 | A1* | 10/2013 | Walker | H04N 21/44204 725/25 |
| 2013/0276035 | A1* | 10/2013 | Walker | H04N 21/44204 725/62 |
| 2014/0130099 | A1* | 5/2014 | Kunisetty | H04N 21/4667 725/50 |
| 2014/0280764 | A1* | 9/2014 | Dasher | H04L 65/60 709/219 |
| 2014/0282729 | A1* | 9/2014 | Stern | H04N 21/4722 725/40 |
| 2015/0172345 | A1* | 6/2015 | Mantin | H04L 65/60 709/219 |

\* cited by examiner

*Primary Examiner* — Saket K Daftuar

(57) ABSTRACT

A device receives information associated with over-the-top (OTT) content associated with a user of the device. The device retrieves, from an OTT content delivery system, an address a playback position, and a manifest file associated with the OTT content, where the manifest file identifies chunks of content associated with the OTT content. The device retrieves, from the OTT content delivery system, one or more chunks, of the chunks of content associated with the OTT content, based on the address, the playback position, and the manifest file, where the one or more chunks are fewer than all of the chunks. The device stores the one or more chunks in the memory, receives an instruction to play the OTT content after the one or more chunks are stored, and plays the one or more chunks, based on the instruction, while simultaneously obtaining remaining chunks of the OTT content.

20 Claims, 12 Drawing Sheets

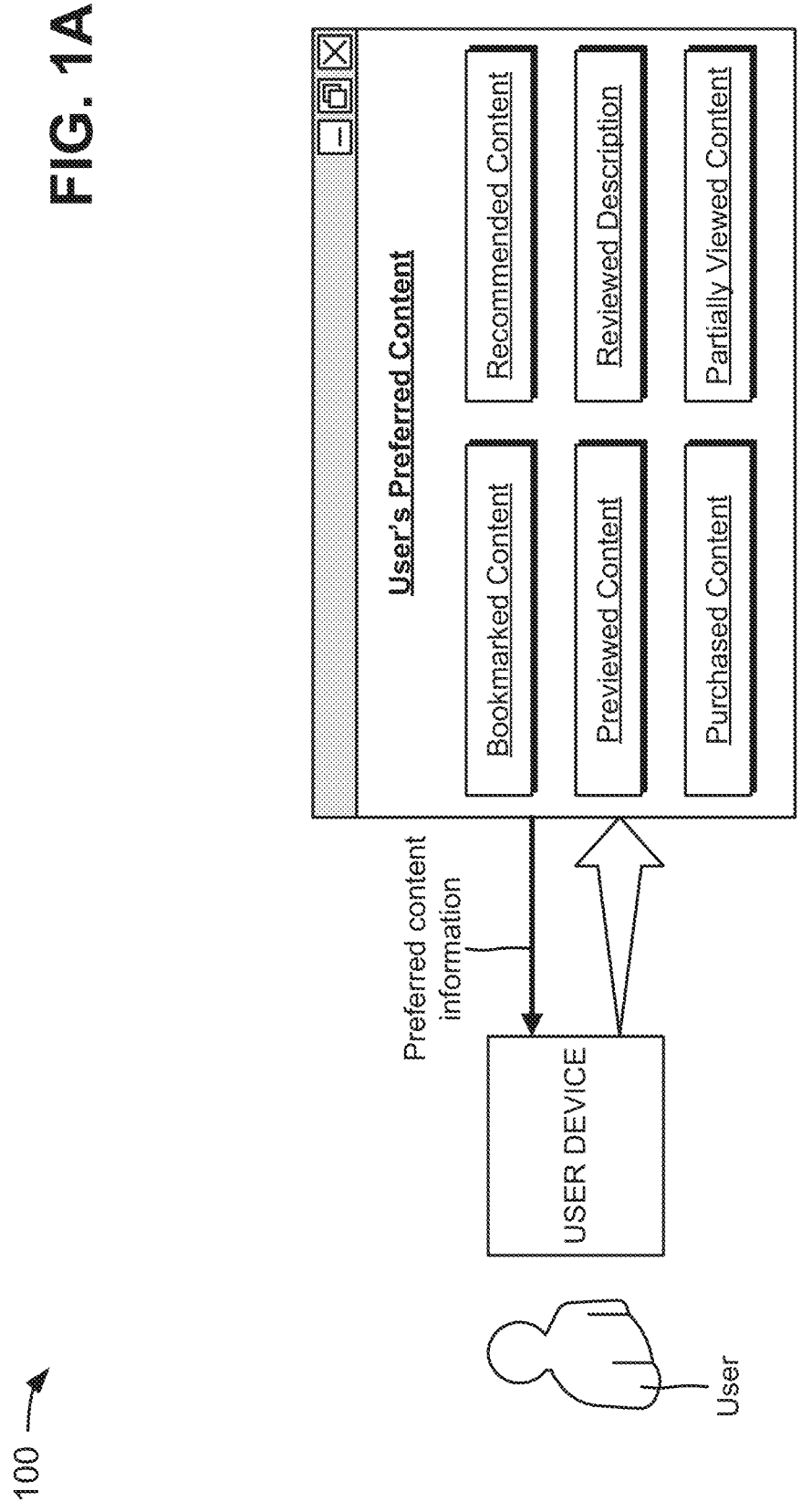

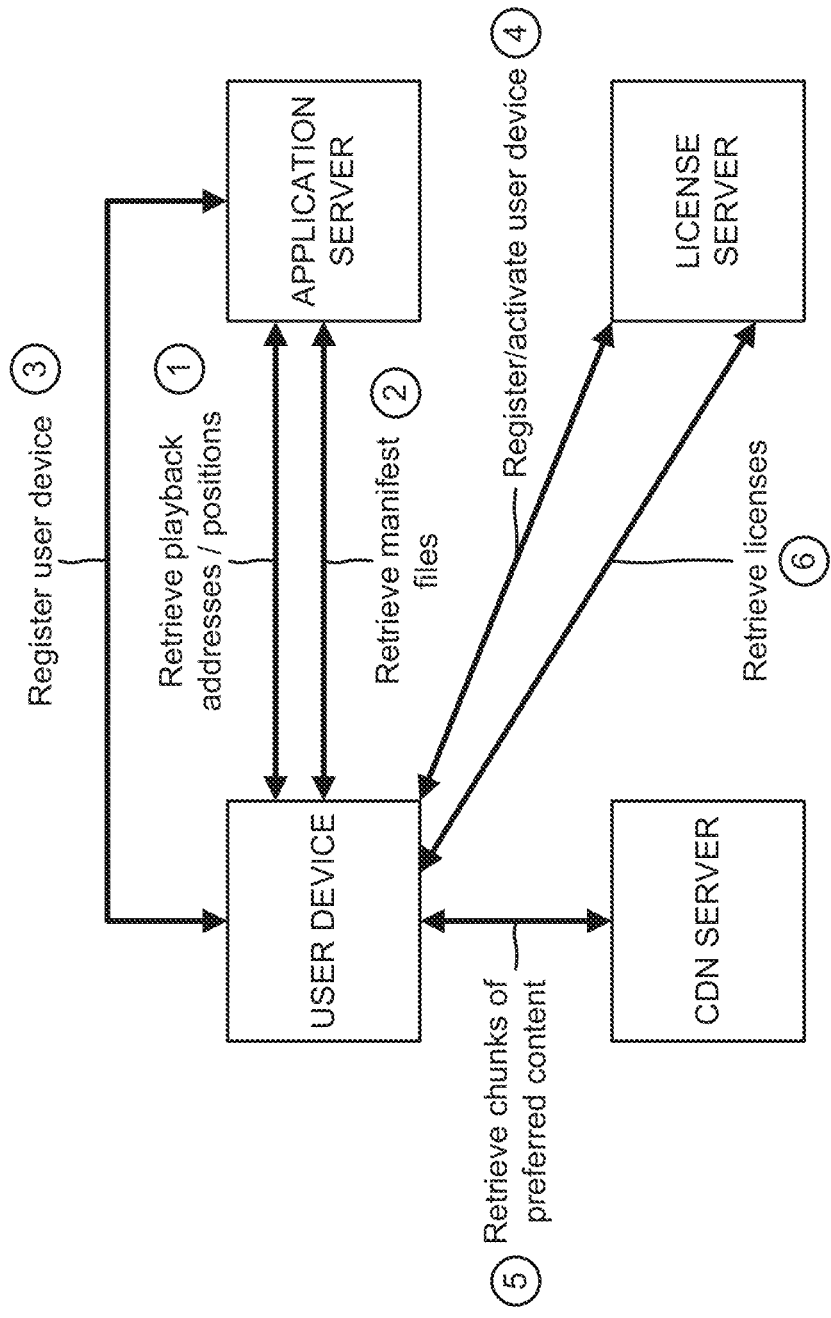

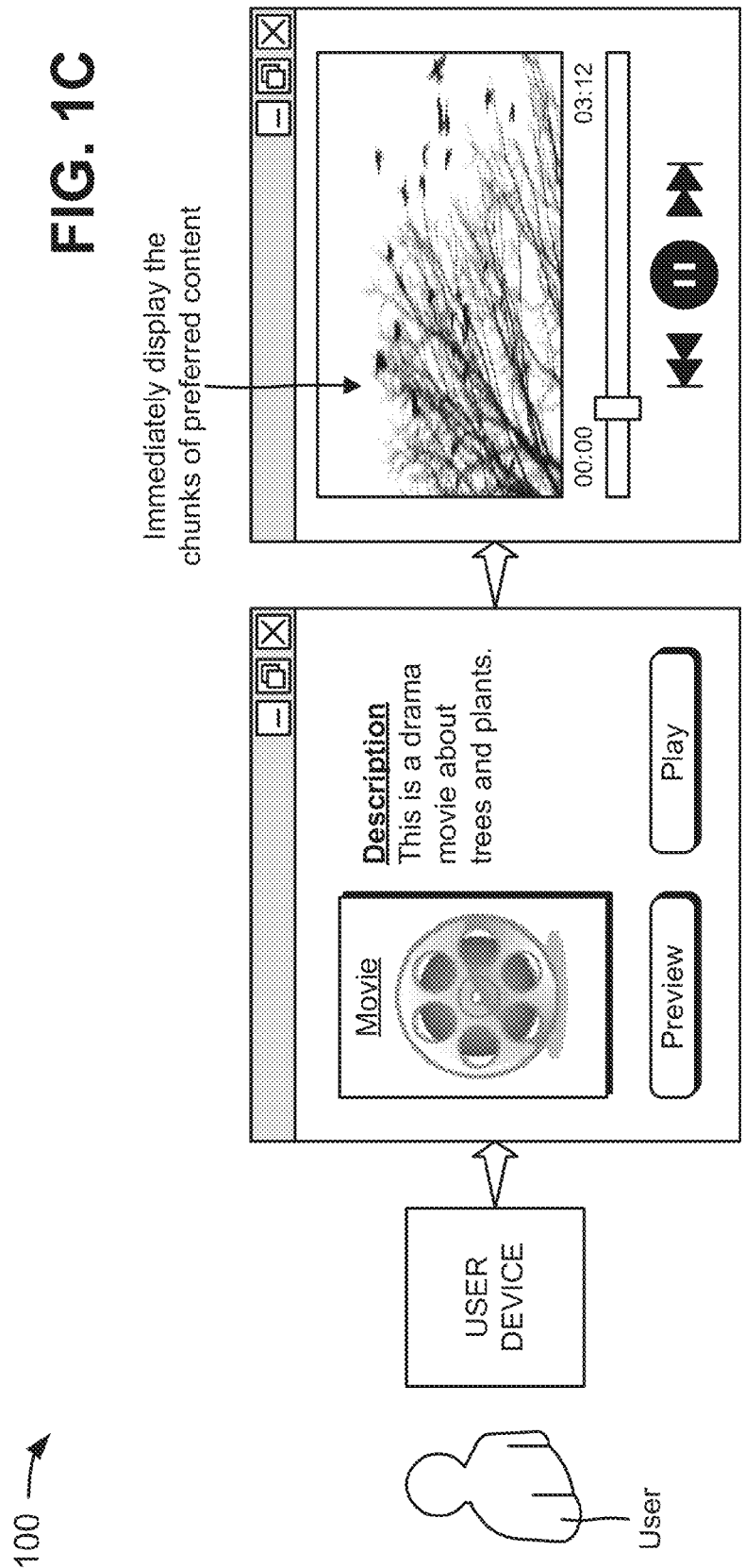

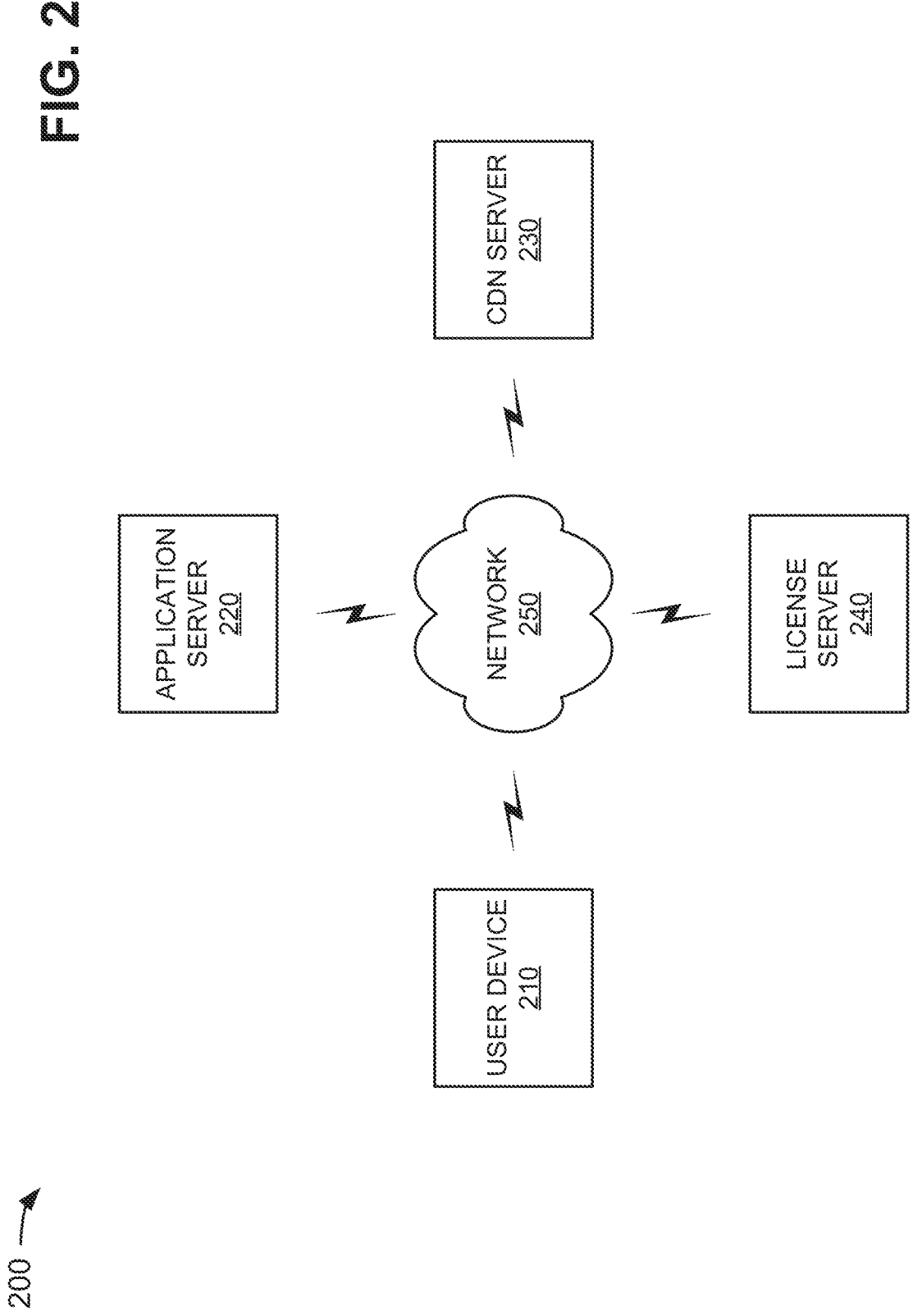

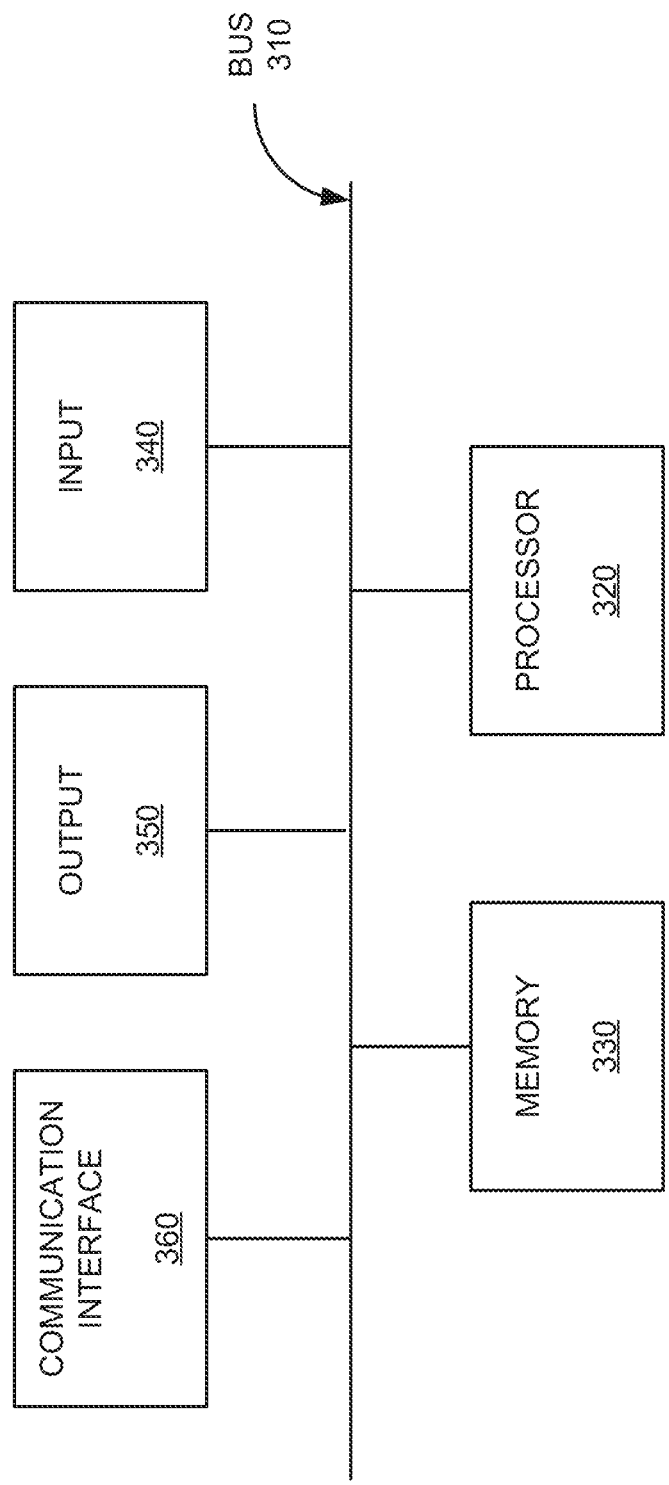

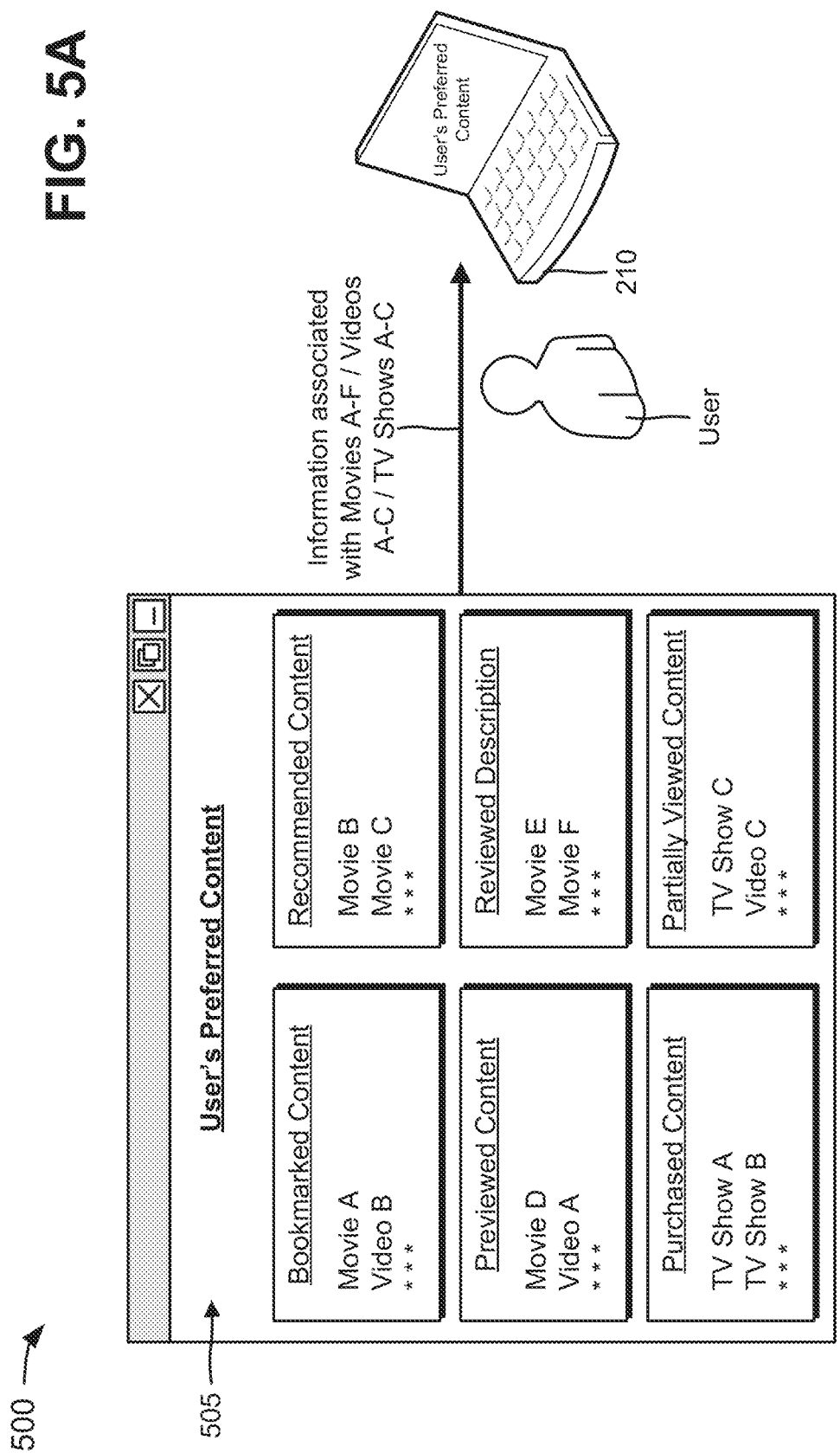

PROCESSING OVER-THE-TOP CONTENT FOR IMPROVED INITIAL DELIVERY

BACKGROUND

Over-the-top (OTT) content includes the on-line delivery of video, audio, images, etc. without an Internet service provider involved in the control or distribution of the content. The Internet service provider may be aware of the content of Internet protocol (IP) packets associated with the OTT content, but may not responsible for, nor able to control, viewing abilities, copyrights, and/or other redistribution of the OTT content. This is in contrast to delivery based on purchase or rental of video or audio content (over IP) from the Internet service provider, such as video on demand (VoD) over IP. Users may use user devices, such as computing devices, smart phones, televisions, gaming consoles, etc., to obtain content from OTT content providers (e.g., NowTV, WhereverTV, Apalya, Hulu, Veoh, Jaman, YouTube, etc.) and/or other commercial content providers (e.g. Apple Computer's iTunes, Netflix, etc.).

BRIEF DESCRIPTION OF THE DRAWINGS

FIGS. 1A-1C are diagrams of an overview of an example implementation described herein;

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for processing OTT content for improved initial delivery of the OTT content to a user device; and FIGS. 5A-5F are diagrams of an example relating to the example process shown in FIG. 4.

DETAILED DESCRIPTION OF PREFERRED EMBODIMENTS

Figure 5B:
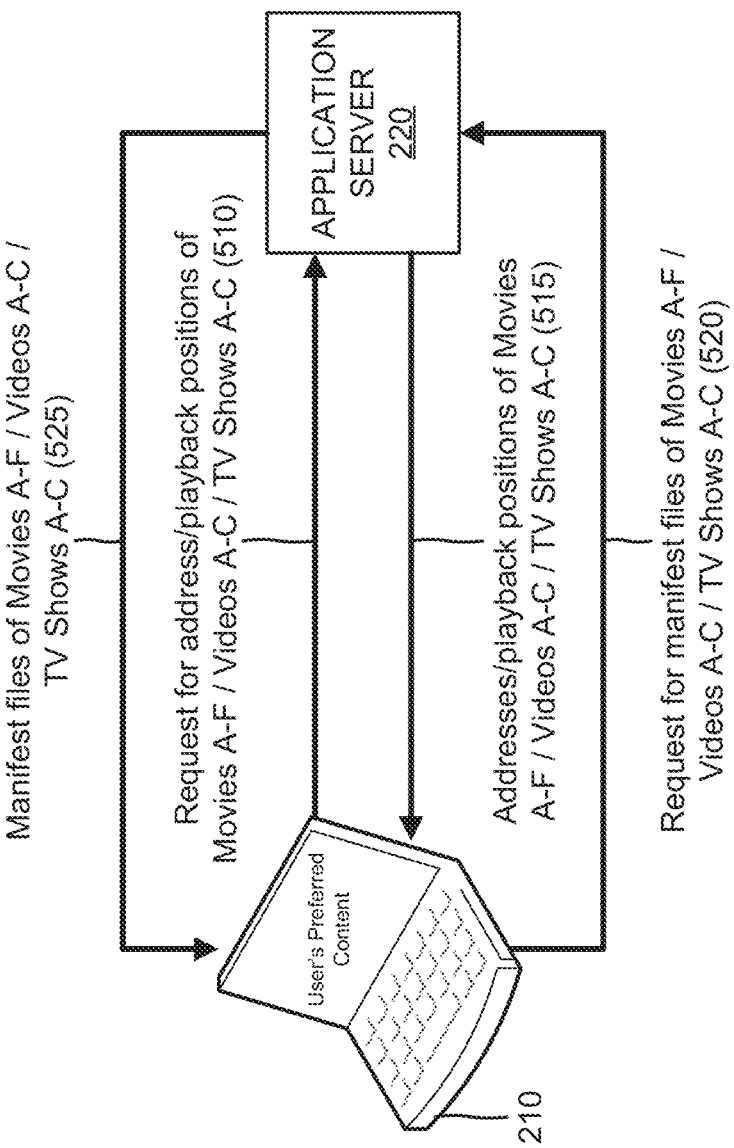

The following detailed description refers to the accompanying drawings. The same reference numbers in different drawings may identify the same or similar elements.

Currently, when a user elects to start viewing and/or listening to OTT content on a user device, the user device takes an inordinate amount of time (e.g., five to eight seconds) to start the OTT content. The inordinate amount of time occurs since an OTT content delivery system needs to perform a variety of operations before the OTT content is started on the user device. For example, the OTT content delivery system needs to retrieve the OTT content, register the user device, activate the user device, retrieve a license for the OTT content, etc. before the OTT content may be started on the user device. The inordinate amount of time creates a bad user experience compared to, for example, a user experience associated with viewing television channels, where the user may start viewing a television channel immediately after the channel is selected by the user.

FIGS. 1A-1C are diagrams of an overview of an example implementation 100 described herein. As shown in FIG. 1A, a user device may be associated with a user, and the user device may provide a user interface for display to the user. In example implementation 100, assume that the user previously utilized the user device to execute an application that provides access to OTT content provided by an OTT content delivery system. Further, assume that the user previously bookmarked some of the OTT content, received recommended OTT content from the OTT content delivery system, previewed some of the OTT content, reviewed descriptions associated with some of the OTT content, purchased some of the OTT content, partially viewed some of the OTT content, etc. Such OTT content may be referred to as preferred OTT content of the user. As further shown in FIG. 1A, the user interface may display information associated with the preferred OTT content to the user. The user device may receive the information associated with the preferred OTT content, and may store the information.

As shown in FIG. 1B, the user device, an application server, a license server, and a content distribution network (CDN) server may be connected. The application server, the license server, and the CDN server may be part of the OTT content delivery system. As further shown in FIG. 1B, the user device may perform preprocessing of all of the preferred OTT content (e.g., via the OTT content delivery system) prior to the user selecting to play any of the preferred OTT content. The preprocessing of the preferred OTT content may enable the preferred OTT content to be ready to play by the user device when selected by the user.

As shown in FIG. 1B, the user device may retrieve addresses (e.g., locations of the preferred OTT content in the CDN server) and/or playback positions of the preferred OTT content from the application server, and may store the addresses and/or playback positions. The user device may then retrieve manifest files (e.g., files that list all segments or chunks included in content) for the preferred OTT content from the application server, and may store the manifest files. The user device may be registered with the application server and the license server for the preferred OTT content if the user device is physically capable of playing the preferred OTT content. The license server may also activate the user device to play the preferred OTT content. The user device may utilize the addresses/playback positions and/or the manifest files to retrieve chunks (e.g., portions) of the preferred OTT content from the CDN server, and may store the retrieved chunks. The user device may retrieve licenses for the preferred OTT content from the license server, and may store the retrieved licenses.

After the user device performs the preprocessing of the preferred OTT content, assume that the user utilizes the user device to view information associated with particular preferred OTT content (e.g., Movie), as shown in FIG. 1C. As shown, the user device may display an image associated with the Movie, a partial description of the Movie, a preview selection mechanism, and a play selection mechanism. Further, assume that the user selects the play selection mechanism. When the user selects the play selection mechanism, the user device may immediately (e.g., in less than approximately one second) start playing the Movie. As further shown in FIG. 1C, the user device may immediately play the Movie since the user device plays a chunk(s) of the Movie previously retrieved from the CDN server and stored by the user device. The CDN server may deliver a remaining portion of the Movie while the user device playing the chunk(s) of the Movie.

Such preprocessing of preferred OTT content may enable the user device to start playing the preferred OTT content immediately after the user elects to play the preferred OTT content. Thus, the user may play the preferred OTT content quickly and in a similar manner to viewing television channels.

FIG. 2 is a diagram of an example environment 200 in which systems and/or methods described herein may be implemented. As illustrated, environment 200 may include a user device 210, an application server 220, a CDN server 230, a license server 240, and a network 250. In some implementations, application server 220, CDN server 230, and license server 240 may be part of an OTT content delivery system. Devices/networks of environment 200 may interconnect via wired connections, wireless connections, or a combination of wired and wireless connections.

User device 210 may include a device that is capable of communicating over network 250 with application server 220, CDN server 230, and/or license server 240. In some implementations, user device 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer; a workstation computer; a personal computer; a television; a set-top box (STB); a gaming console; a consumer electronics (CE) device; or another type of computation and communication device.

Application server 220 may include one or more personal computers, workstation computers, server devices, or other types of computation and communication devices. In some implementations, application server 220 may provide a catalog of OTT content that users may browse and search, and from which the users may buy, rent, or subscribe to OTT content. Application server 220 may support interactions between user devices 210 and backend servers (e.g., CDN server 230), and may determine formats for the OTT content based on types of user devices 210. Application server 220 may store user transaction histories, including subscriptions, purchases, and rentals, Application server 220 may store addresses and positions for the OTT content, and may store manifest files (e.g., files that list segments or chunks included in the OTT content) associated with the OTT content. By storing the playback positions, application server 220 may enable users to view OTT content from the playback positions of the OTT content rather than from the beginning of the OTT content.

CDN server 230 may include one or more personal computers, workstation computers, server devices, or other types of computation and communication devices. In some implementations, CDN server 230 may store the OTT content to be delivered to user devices 210. In some implementations, the OTT content may include video, audio, images, etc. that may or may not be encrypted, In some implementations, the OTT content may be formatted into a variety of formats for different types of user devices 210, such as, for example a hypertext transfer protocol (HTTP) Live Streaming format, a Microsoft Smooth Streaming format, etc. One or more CDN servers 230 may be distributed geographically based on user demands, and may include origin servers, edge distribution servers, distribution appliances, etc.

License server 240 may include one or more personal computers, workstation computers, server devices, or other types of computation and communication devices. In some implementations, license server 240 may issue, validate, and enforce licenses, associated with the OTT content, for user devices 210. In some implementations, license server 240 may ensure that OTT content is encrypted according to digital rights management (DRM) rules. In some implementations, license server 240 may distribute DRM licenses that include content decryption keys that enable encrypted OTT content, provided by CDN server 230, to be unlocked by user devices 210.

Network 250 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementation, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a ouch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for processing OTT content for improved initial delivery of the OTT content to a user device. In some implementations, one or more process blocks of FIG. 4 may be performed by user device 210. In some implementations, one or more process blocks of FIG. 4 may be performed by another device or a group of devices separate from or including user device 210.

As shown in FIG. 4, process 400 may include receiving information associated with preferred content of a user of a device (block 405). For example, a user may be associated with user device 210, and may utilize user device 210 to access OTT content provided by CDN server 230. In some implementations, while accessing the OTT content, the user may, via user device 210, bookmark some of the OTT content (e.g., mark as a favorite), receive recommended OTT content from application server 220, preview some of the OTT content, review descriptions associated with some of the OTT content, purchase some of the OTT content, partially view some of the OTT content, etc. Such OTT content may be referred to as preferred OTT content of the user. User device 210 may receive information associated with the preferred OTT content of the user. In some implementations, the information may include title information, descriptions, images, previews, duration information, and/or other information associated with the preferred OTT content.

In some implementations, user device 210 may perform preprocessing of the preferred OTT content, as described below in connection with blocks 410-440. User device 210 may perform the preprocessing of the preferred OTT content so that the preferred OTT content is ready to be immediately (in less than approximately one second) played by user device 210. In some implementations, user device 210 may periodically (e.g., when powered on, after a particular time period, at certain time of day, when new preferred OTT is added by the user, etc.) perform the preprocessing of the preferred OTT content. In some implementations, user device 210 may perform the preprocessing of the preferred OTT content when instructed by the user. In some implementations, user device 210 may perform the preprocessing of the preferred OTT content when the user utilizes user device 210 to execute the application that accesses the OTT content delivery system. In some implementations, user device 210 may preform preprocessing of preferred OTT content in which the user has shown interest within a particular time period (e.g., within a particular amount of hours, days, weeks, etc.). For example, user device 210 may preprocess preferred OTT content that was bookmarked less than two days ago, may preprocess all of the purchased preferred OTT content, may not preprocess preferred OTT content that was bookmarked a week ago, may not preprocess preferred OTT content that was previewed one month ago, etc.

As further shown in FIG. 4, process 400 may include retrieving, from an application server, addresses and positions associated with the preferred content (block 410). For example, user device 210 may retrieve addresses and playback positions, associated with the preferred OTT content, from application server 220. The addresses may include information identifying locations (e.g., uniform resource locators (URLs) of the preferred OTT content within CDN server 230. The playback positions may include information identifying where the user stopped playing the preferred OTT content when the user last accessed the preferred OTT content.

In some implementations, user device 210 may, periodically, when instructed by the user, or when the application is initiated, generate a request for the addresses and playback positions associated with the preferred OTT content, and may provide the request to application server 220. The request may include information identifying the user, the information associated with the preferred OTT content, information requesting the addresses and playback positions of the preferred OTT content, etc. Application server 220 may receive the request, and may identify, based on the request, the addresses and the playback positions of the preferred OTT content. In some implementations, application server 220 may be associated with a data structure (e.g., a database, a table, a list, etc.) that includes information identifying OTT content, addresses of the OTT content, and playback positions of the OTT content for particular users. Application server 220 may utilize the data structure to identify the addresses and the playback positions of the preferred OTT content. Application server 220 may provide the identified addresses and playback positions of the preferred OTT content to user device 210. User device 210 may receive the addresses and the playback positions of the preferred OTT content, and may store the addresses and the playback positions of the preferred OTT content (e.g., in memory 330, FIG. 3).

As further shown in FIG. 4, process 400 may include retrieving, from the application server, manifest files associated with the preferred content (block 415). For example, user device 210 may retrieve manifest files, associated with the preferred OTT content, from application server 220. Each manifest file may be associated with particular preferred OTT content, and may include a list of all of the segments or chunks included in the particular preferred OTT content.

In some implementations, user device 210 may, periodically, when instructed by the user, or when the application is initiated, generate a request for the manifest files associated with the preferred OTT content, and may provide the request to application server 220. The request may include information identifying the user, the information associated with the preferred OTT content, information requesting the manifest files of the preferred OTT content, etc. Application server 220 may receive the request, and may identify, based on the request, the manifest files of the preferred OTT content. In some implementations, application server 220 may be associated with a data structure that includes information identifying OTT content and manifest files of the OTT content. Application server 220 may utilize the data structure to identify the manifest files of the preferred OTT content. Application server 220 may provide the identified manifest files of the preferred OTT content to user device 210. User device 210 may receive the manifest files of the preferred OTT content, and may store the manifest files of the preferred OTT content (e.g., in memory 330, FIG. 3).

As further shown in FIG. 4, process 400 may include determining whether the preferred content is in a particular streaming format (block 420). For example, user device 210 may determine whether the preferred OTT content is in a particular streaming format, such as, for example, the HTTP Live Streaming format. In some implementations, user device 210 may determine that the preferred OTT content is in the HTTP Live Streaming format. In some implementations, user device 210 may determine that the preferred OTT content is not in the HTTP Live Streaming format, and is in another streaming format, such as, for example, the Microsoft Smooth Streaming format. In some implementations, user device 210 may be registered and activated differently depending upon the streaming format associated with the preferred OTT content. For example, user device 210 may be registered and activated via particular interactions with application server 220 and license server 240 when the preferred OTT content is in the particular streaming format (e.g., the HTTP Live Streaming format). User device 210 may be registered and activated via an authentication token when the preferred OTT content is in another streaming format (e.g., the Microsoft Smooth Streaming format).

As further shown in FIG. 4, if the preferred content is not in the particular streaming format (block 420-NO), process 400 may include utilizing an authentication token to register and activate the device (block 425). For example, if user device 210 determines that the preferred OTT content is not in the particular streaming format (e.g., the HTTP Live Streaming format), user device 210 may utilize an authentication token to register and activate user device 210 with application server 220 and/or license server 240. In some implementations, user device 210 may receive an authentication token (e.g., a short-lived token) when the user is authenticated by the OTT content delivery system. For example, the user may utilize user device 210 to access the OTT content delivery system via a user login process. If the user successfully logs into the OTT content delivery system, the user may be authenticated and user device 210 may receive the authentication token.

In some implementations, the authentication token may be used to register user device 210 with application server 220 and/or license server 240. For example, user device 210 may provide the authentication token to application server 220 and/or license server 240. Application server 220 and/or license server 240 may utilize the authentication token to automatically register user device 210. When user device 210 is registered, application server 220 and/or license server 240 may determine that user device 210 includes the components needed to play the preferred OTT content. In some implementations, user device 210 may be previously registered with application server 220 and/or license server 240 prior to receiving the information associated with the preferred OTT content (e.g., when the user togs into the OTT content delivery system with user device 210).

In some implementations, the authentication token may be used to activate user device 210 with license server 240. For example, user device 210 may provide the authentication token to license server 240, and license server 240 may utilize the authentication token to automatically activate user device 210. When user device 210 is activated, license server 240 may initiate user device 210 so that user device 210 is able to play the preferred OTT content.

As further shown in FIG. 4, if the preferred content is in the particular streaming format (block 420—YES), process 400 may include registering and activating the device via the application server and the license server (block 430). For example, if user device 210 determines that the preferred OTT content is in the particular streaming form (e.g., the HTTP Live Streaming format), user device 210 may register and activate user device 210 via application server 220 and/or license server 240.

In some implementations, user device 210 may, periodically, when instructed by the user, or when the application is initiated, generate a request to register user device 210, and may provide the request to application server 220 and/or license server 240. The request may include information identifying features of user device 210 (e.g., a type of content player of use device 210, an amount of memory in user device 210, an application stored in user device 210, etc.). Application server 220 and/or license server 240 may determine, based on the request, whether user device 210 includes the components needed to play the preferred OTT content. If application server 220 and/or license server 240 determine that user device 210 includes the components needed to play the preferred OTT content, application server 220 and/or license server 240 may register user device 210. In some implementations, user device 210 may be previously registered with application server 220 and/or license server 240 prior to receiving the information associated with the preferred OTT content.

In some implementations, user device 210 may, periodically, when instructed by the user, or when the application is initiated, generate a request to activate user device 210 for playing the preferred OTT content, and may provide the request to license server 240. License server 240 may determine, based on the request, whether to activate user device 210 for playing the preferred OTT content. For example, license server 240 may determine whether the user has purchased rights to the preferred OTT content. If license server 240 determines that the user has purchased rights to the preferred OTT content, license 240 may activate user device 210. When user device 210 is activated, license server 240 may initiate user device 210 so that user device 210 is able to play the preferred OTT content.

As further shown in FIG. 4, process 400 may include retrieving portions of the preferred content from a CDN server (block 435). For example, user device 210 may utilize the addresses, the playback positions, and the manifest files of the preferred OTT content to retrieve at least one portion (e.g., a chunk) for each of the preferred OTT content from CDN server 230. In some implementations, the portions of the preferred OTT content may include chunks provided at a beginning of the preferred OTT content when the user has not partially played the preferred OTT content. In some implementations, the portions of the preferred OTT content may include chunks provided at a playback position of the preferred OTT content when the user has partially played the preferred OTT content and stopped at the playback position. In some implementations, the chunk for each of the preferred OTT content may be sized so that retrieval of the chunks of the preferred OTT content may not require a lot of time and resources. The chunk for each of the preferred OTT content may also be sized so that a time associated with playing the chunk will enable CDN server 230 to deliver remaining portions of the preferred OTT content to user device 210.

In some implementations, user device 210 may, periodically, when instructed by the user, or when the application is initiated, generate a request for the portions of the preferred OTT content, and may provide the request to CDN server 230. The request may include the addresses, the playback positions, and the manifest files of the preferred OTT content; information requesting the portions of the preferred OTT content; etc. CDN server 230 may receive the request, and may identify, based on the request, the portions of the preferred OTT content. In some implementations, CDN server 230 may be associated with a data structure that includes OTT content, addresses pointing to the OTT content, manifest files of the OTT content, etc. CDN server 230 may utilize the data structure to identify the portions of the preferred OTT content. CDN server 230 may provide the identified portions of the preferred OTT content to user device 210. User device 210 may receive the portions of the preferred OTT content, and may store the portions of the preferred OTT content (e.g., in memory 330, FIG. 3).

In some implementations, CDN server 230 may no provide the portions of the preferred OTT content to user device 210. Rather, CDN server 230 may utilize the addresses, the playback positions, and the manifest files of the preferred OTT content to determine connections for providing the portions of the preferred OTT content to user device 210. For example, CDN server 230 may identify the locations of the portions of the preferred OTT content within a memory (e.g., memory 330, FIG. 3) of CDN server 230, and may determine connections for user device 210 to retrieve a portion of the preferred OTT content from the identified locations. In some implementations, CDN server 230 may store information associated with the determined connections (e.g., in memory 330, FIG. 3). When user device 210 requests a particular preferred OTT content, CDN server 230 may immediately (e.g., in less than approximately one second) connect user device 210 to retrieve the portion of the particular preferred OTT content since CDN server 230 previously stored the connection information. In some implementations, CDN server 230 may store the portions of the preferred OTT content in an unencrypted format so that user device 210 may play the portions of the preferred OTT content without utilizing DRM content decryption keys.

As further shown in FIG. 4, process 400 may include retrieving licenses for the preferred content from the license server (block 440). For example, user device 210 may retrieve licenses for the preferred OTT content from license server 240. In some implementations, the licenses for the preferred OTT content may include DRM licenses with content decryption keys. The content decryption keys may enable user device 210 to unlock encrypted OTT content received from CDN server 230. In some implementations, the DRM licenses may be stored or cached by user device 210 and may have short lives.

In some implementations, user device 210 may, periodically, when instructed by the user, or when the application is initiated, generate a request for the licenses of the preferred OTT content, and may provide the request to license server 240. The request may include information identifying user device 210, an authentication token, information requesting the licenses of the preferred OTT content, etc. License server 240 may receive the request, and may identify, based on the request, the licenses for the preferred OTT content. In some implementations, license server 240 may be associated with a data structure that includes licenses for OTT content, information identifying user devices 210, information identifying entitlements of users, etc. License server 240 may utilize the data structure to identify the licenses for the preferred OTT content. License server 240 may provide the identified licenses for the preferred OTT content to user device 210. User device 210 may receive the licenses for the preferred OTT content, and may store the licenses for the preferred OTT content (e.g., in memory 330, FIG. 3).

As further shown in FIG. 4, process 400 may include receiving an instruction to play particular preferred content from the user (block 445). For example, after user device 210 performs the aforementioned operations, the user may utilize user device 210 to browse through the preferred OTT content. The user may select a particular preferred OTT content, and user device 210 may display information associated with the particular preferred OTT content. In some implementations, user device 210 may display images associated with the particular preferred OTT content, a description of the particular preferred OTT content, etc. The user may instruct user device 210 to play the particular preferred 0117 content, and user device 210 may receive the instruction. In some implementations, user device 210 may display a play selection mechanism (e.g., a button, an icon, a link, etc.) with the information associated with the particular preferred OTT content. The play mechanism, when selected by the user, may instruct user device 210 to play the particular preferred OTT content.

As further shown in FIG. 4, process 400 may include immediately playing a portion of the particular preferred content based on the instruction (block 450). For example, when user device 210 receives the instruction to play the particular preferred OTT content, user device 210 may retrieve (e.g., from memory) the portion of the particular preferred OTT content. In some implementations, user device 210 may play the portion of the particular preferred OTT content for the user almost immediately (e.g., in less than approximately one second) after user device 210 receives the instruction from the user.

In some implementations, while the portion of the particular preferred OTT content is playing on user device 210, CDN server 230 may provide the particular preferred OTT content to user device 210. In some implementations, CDN server 230 may provide the remaining portion of the particular preferred OTT content e.g., other than the portion of the particular preferred OTT content) to user device 210, and user device 210 may play the remaining portion for the user.

In some implementations, the user may be permitted to simultaneously play OTT content on a particular number (e.g., four, five, etc.) of user devices 210 associated with an account of the user. The user's account may be utilized by multiple users (e.g., a family of six may utilize one account) with different user devices 210. For example, if the particular number is five, the user account may permit simultaneously playing a movie on a television, a video on a smart phone, and a television show on a personal computer since only three user devices 210 (e.g., the television, the smart phone, and the personal computer) are utilized, which does not exceed the particular number. In some implementations, prior to playing the portion of the particular preferred OTT content, user device 210 may initiate a call to application server 220 to determine whether playing the portion of the particular preferred OTT content will cause the user's account to exceed the particular number. If playing the portion of the particular preferred OTT content will not cause the user's account to exceed the particular number, user device 210 may play the portion of the particular preferred OTT content. If playing the portion of the particular preferred OTT content will cause the user's account to exceed the particular number, user device 210 may not play the portion of the particular preferred OTT content and may inform the user that the particular number will be exceeded.

In some implementations, while user device 210 is playing the portion of the particular preferred OTT content, the OTT content delivery system may determine whether playing the portion of the particular preferred OTT content will cause the user's account to exceed the particular number. If playing the portion of the particular preferred OTT content will not cause the user's account to exceed the particular number, user device 210 may continue to play the portion of the particular preferred OTT content. If playing the portion of the particular preferred OTT content will cause the user's account to exceed the particular number, user device 210 may stop playing the portion of the particular preferred OTT content.

In some implementations, when CDN server 230 does not provide the portions of the preferred OTT content to user device 210, CDN server 230 may connect to user device 210

(e.g., based on the stored connection information in CDN server 230) after user device 210 receives the instruction to play the particular preferred OTT content. CDN server 230 may provide the particular preferred OTT content to user device 210, and user device 210 may play the particular preferred OTT content for the user almost immediately (e.g., in less than approximately one second). In some implementations, user device 210 may determine whether playing the particular preferred OTT content will cause the user's account to exceed the particular number prior to or after receiving the particular preferred OTT content from CDN server 230. User device 210 may not play or may stop playing the particular preferred OTT content if the particular number will be exceeded.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example 500 relating to example process 400 shown in FIG. 4. In example 500, assume that a user is associated with user device 210 (e.g., laptop computer 210), as shown in FIG. 5A. Further, assume that the user previously utilized laptop computer 210 to execute an application that provides access (e.g., browse, search, preview, purchase, etc.) to OTT content provided by an OTT content delivery system (e.g., application server 220, CDN server 230, and license server 240). The user may have bookmarked some of the OTT content by indicating, to the OTT content delivery system, that such OTT content is favored by the user. Based on the user's OTT content accessing habits, the OTT content delivery system may have recommended OTT content to the user. The user may have previewed some of the OTT content, and may review descriptions associated with some of the OTT content. The user may have purchased some of the OTT content, and may have partially viewed some of the OTT content. The bookmarked OTT content, the recommended OTT content, the previewed OTT content, the reviewed description OTT content, the purchased OTT content, and the partially viewed OTT content may be referred to as preferred OTT content of the user.

As further shown in FIG. 5A, laptop computer 210 may display a user interface 505 to the user. User interface 505 may display information associated with the preferred OTT content. For example, user interface 505 may display the bookmarked OTT content (e.g., Movie A and Video B); the recommended OTT content (e.g., Movie B and Movie C); the previewed OTT content (e.g., Movie D and Video A); the reviewed description OTT content (e.g., Movie E and Movie F); the purchased OTT content TV Show A and TV Show B); the partially viewed OTT content (e.g., TV Show C and Video C); etc. As further shown in FIG. 5A, laptop computer 210 may receive information associated with the preferred OTT content (e.g., Movies A-F, Videos A-C, and TV Shows A-C), and may store the information.

Figure 5C:
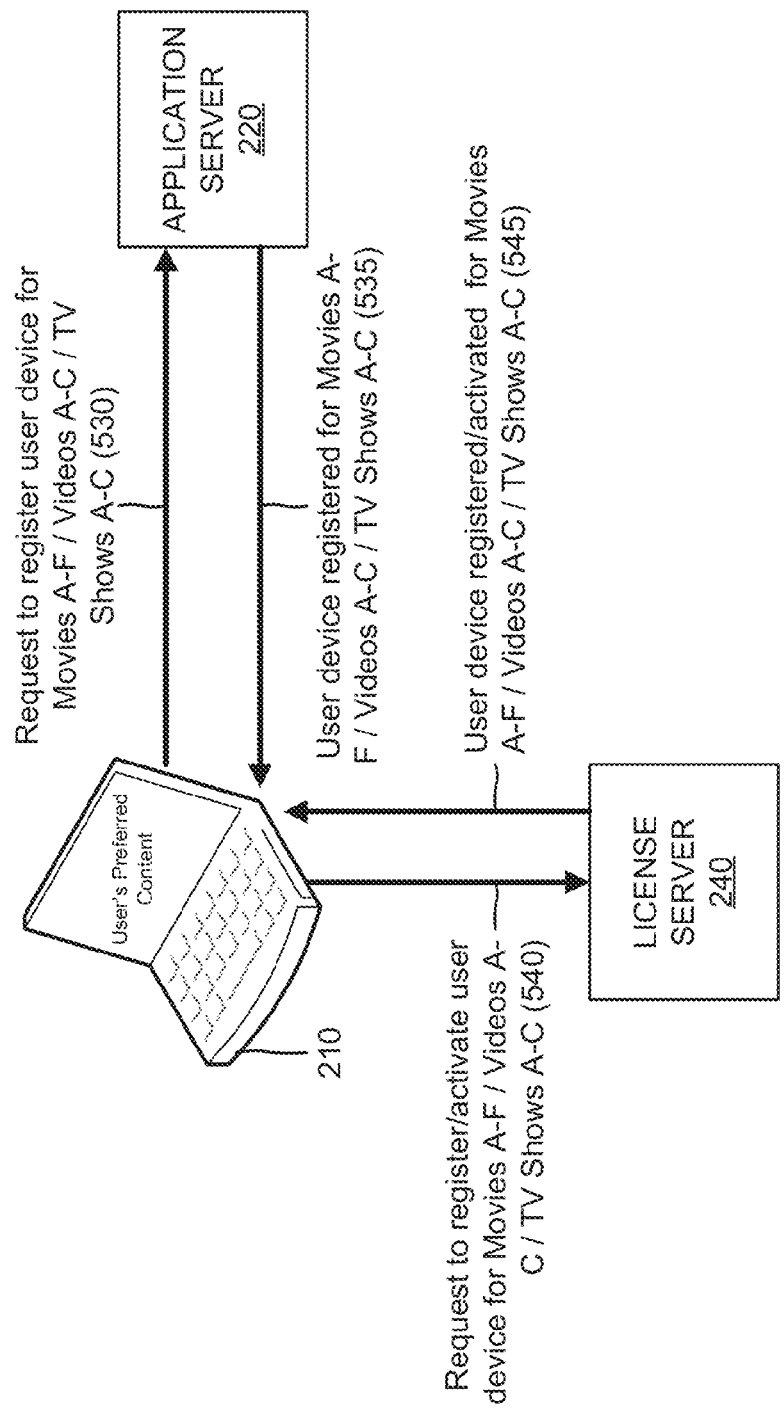
Figure 5D:
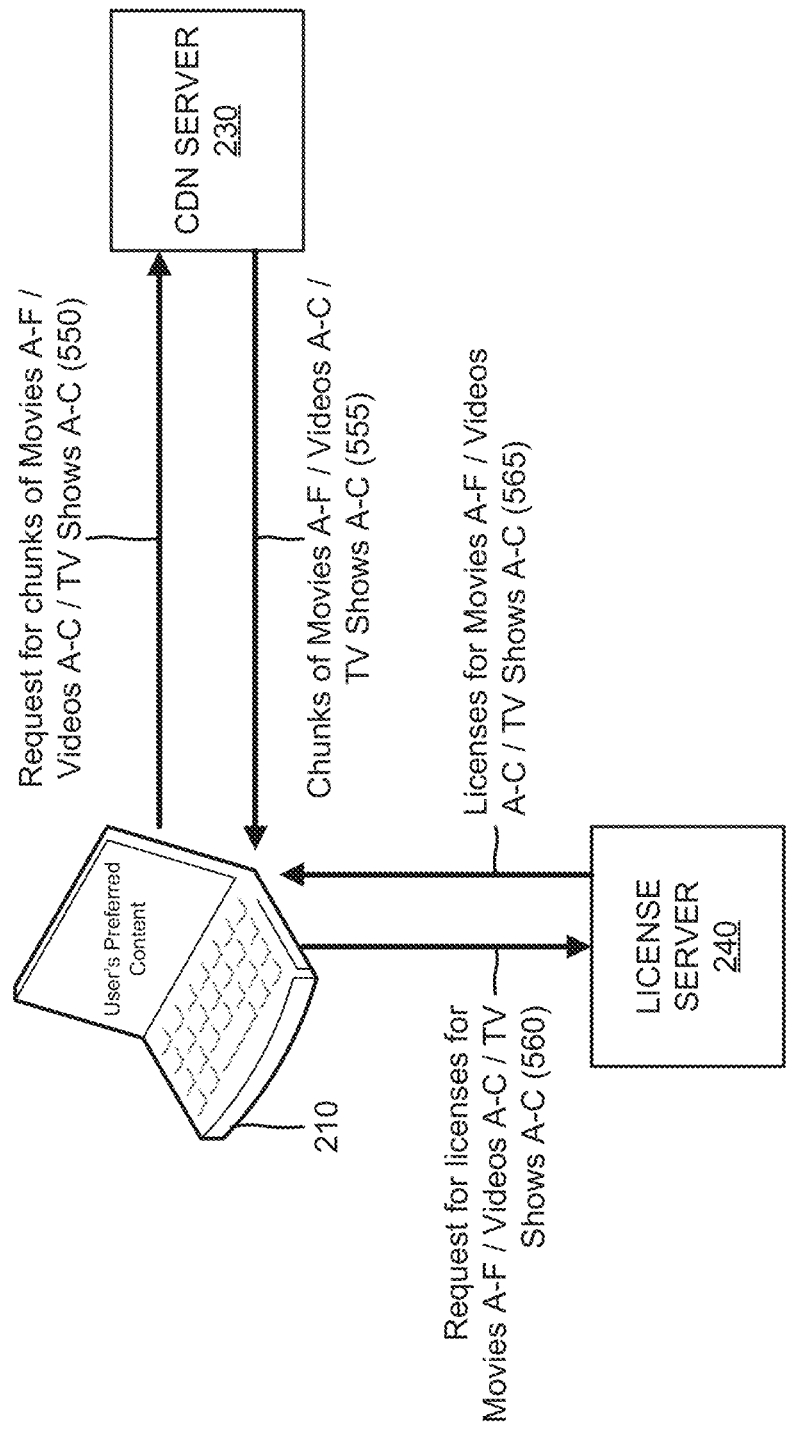

In some implementations, laptop computer 210 may perform preprocessing of Movies A-F, Videos A-C, and TV Shows A-C (e.g., via the OTT content delivery system) prior to the user selecting to play any of Movies A-F, Videos A-C, or TV Shows A-C, as shown in FIGS. 5B-5D. The preprocessing of Movies A-F, Videos A-C, and TV Shows A-C may enable Movies A-F, Videos A-C, and TV Shows A-C to be ready to be played by laptop computer 210. For example, as shown in FIG. 5B, laptop computer 210 may generate a request 510 tier addresses and/or playback positions of Movies A-F, Videos A-C, and TV Shows A-C, and may provide request 510 to application server 220. Application server 220 may receive request 510, and may identify addresses/playback positions 515 of Movies A-F, Videos A-C, and TV Shows A-C based on request 510. Application server 220 may provide addresses/playback positions 515 of Movies A-F, Videos A-C, and TV Shows A-C to laptop computer 210.

As further shown in FIG. 5B, laptop computer 210 may generate a request 520 for manifest files of Movies A-F, Videos A-C, and TV Shows A-C, and may provide request 520 to application server 220. Application server 220 may receive request 520, and may identify manifest files 525 of Movies A-F, Videos A-C, and TV Shows A-C based on request 520. Application server 220 may provide manifest files 525 of Movies A-F, Videos A-C, and TV Shows A-C to laptop computer 210.

As shown in FIG. 5C, laptop computer 210 may generate a request 530 to register laptop computer 210 for Movies A-F, Videos A-C, and TV Shows A-C, and may provide request 530 to application server 220. Application server 220 may receive request 530, and assume that application server 220 registers laptop computer 210 for Movies A-F, Videos A-C, and TV Shows A-C since laptop computer 210 is physically capable of playing Movies A-F, Videos A-C, and TV Shows A-C. Once application server 220 registers laptop computer 210 for Movies A-F, Videos A-C, and TV Shows A-C, application server 220 may provide, to laptop computer 210, a message 535 indicating that laptop computer 210 is registered for Movies A-F, Videos A-C, and TV Shows A-C.

As further shown in FIG. 5C, laptop computer 210 may generate a request 540 to register and activate laptop computer 210 for Movies A-F, Videos A-C, and TV Shows A-C, and may provide request 540 to license server 240. License server 240 may receive request 540, and assume that license server 240 registers laptop computer 210 for Movies A-F, Videos A-C, and TV Shows A-C since laptop computer 210 is physically capable of playing Movies A-F, Videos A-C, and TV Shows A-C. Further, assume that license server 240 activates laptop computer 210 for Movies A-F, Videos A-C, and TV Shows A-C since license server 240 determines that the user has purchased rights to Movies A-F, Videos A-C, and TV Shows A-C. Once license server 240 registers and activates laptop computer 210 for Movies A-F, Videos A-C, and TV Shows A-C, license server 240 may provide, to laptop computer 210, a message 545 indicating that laptop computer 210 is registered and activated for Movies A-F, Videos A-C, and TV Shows A-C.

As shown in FIG. 5D, laptop computer 210 may generate a request 550 for chunks of Movies A-F, Videos A-C, and TV Shows A-C, and may provide request 550 to CDN server 230. Request 550 may include addresses/playback positions 515 and/or manifest files 525 of Movies A-F, Videos A-C, and TV Shows A-C received from application server 220. CDN server 230 may receive request 550, and may identify chunks 555 of Movies A-F, Videos A-C, and TV Shows A-C based on addresses/playback positions 515 and/or manifest files 525 provided in request 550. CDN server 230 may provide chunks 555 of Movies A-F, Videos A-C, and TV Shows A-C to laptop computer 210, and laptop computer 210 may store chunks 555 of Movies A-F, Videos A-C, and TV Shows A-C (e.g., in memory).

As further shown in FIG. 5D, laptop computer 210 may generate a request 560 for licenses for Movies A-F, Videos A-C, and TV Shows A-C, and may provide request 560 to license server 240. License server 240 may receive request 560, and may identify licenses 565 for Movies A-F, Videos A-C, and TV Shows A-C based on request 560. License server 240 may provide licenses 565 for Movies A-F, Videos A-C, and TV Shows A-C to laptop computer 210, and laptop computer 210 may store licenses 565 for Movies A-F, Videos A-C, and TV Shows A-C (e.g., in memory).

Figure 5E:
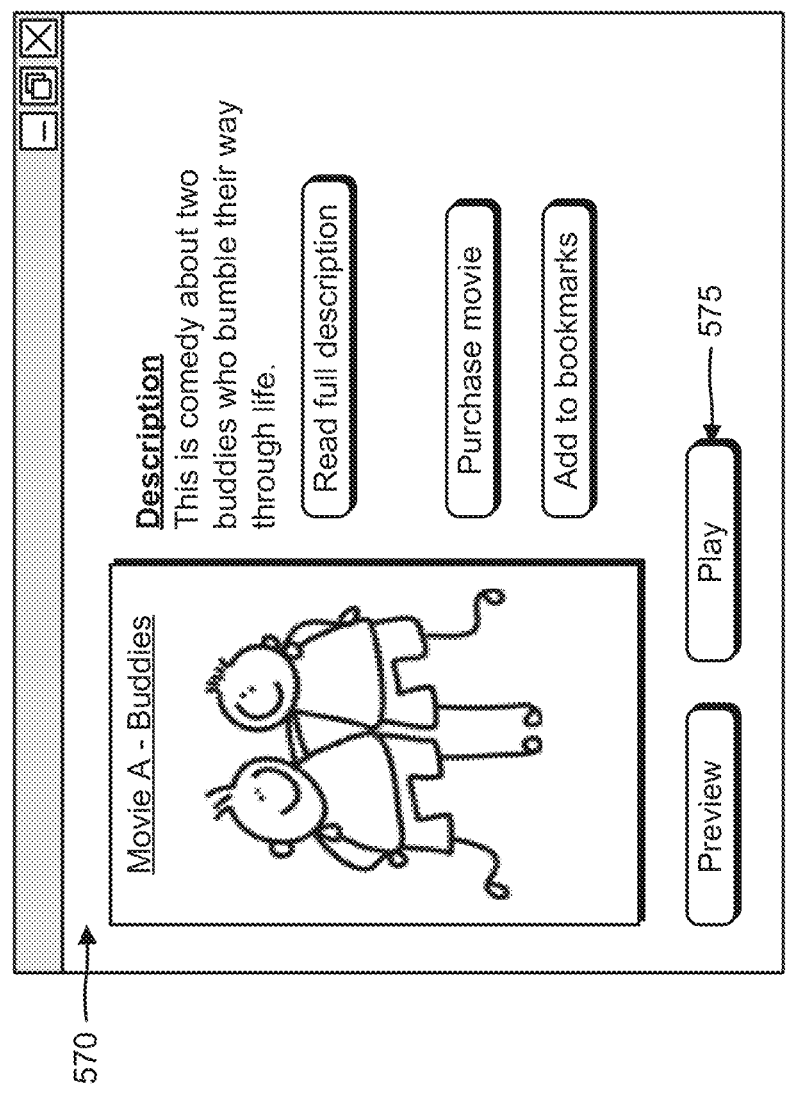
Figure 5F:
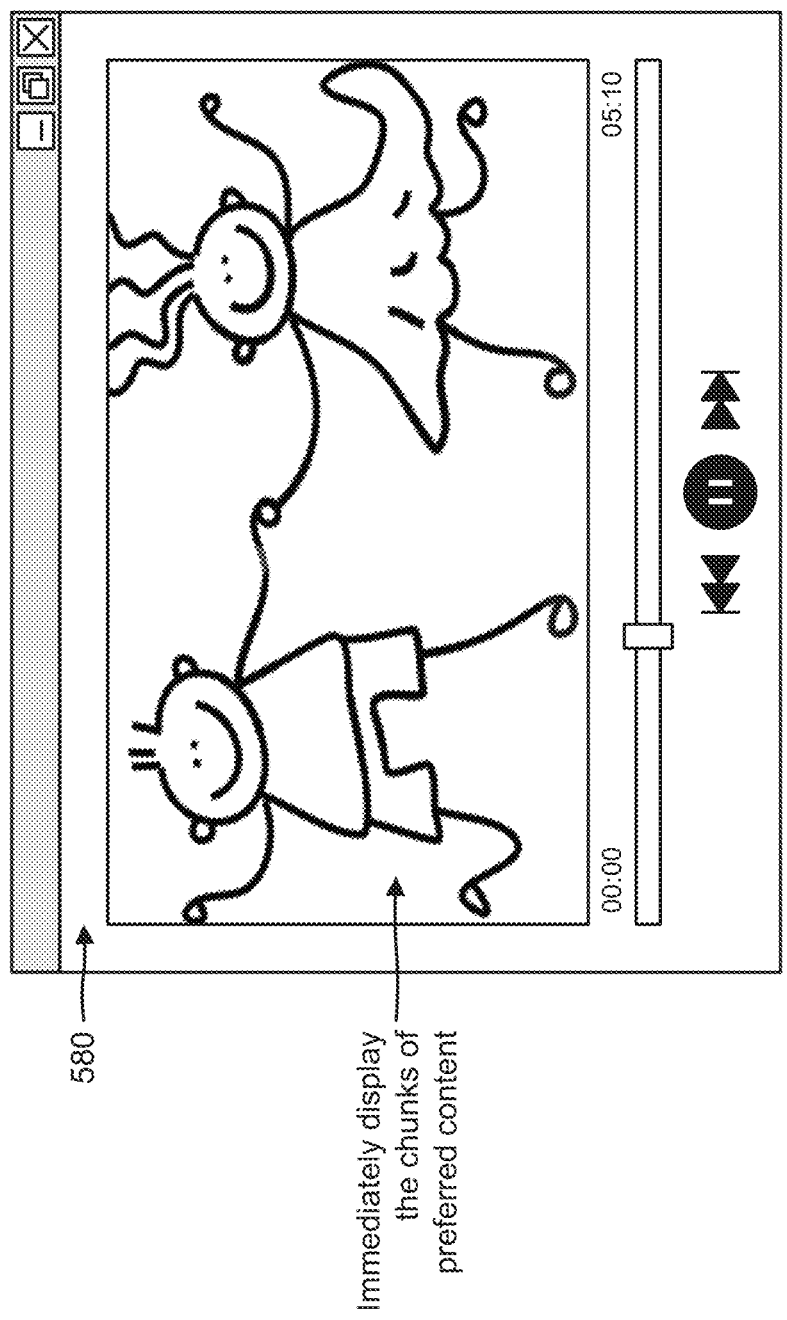

After performing the preprocessing of FIGS. 5B-5D, assume that the user utilizes laptop computer 210 to select one of the movies (e.g., Movie A, entitled "Buddies") provided in the bookmarked OTT content, as shown in user interface 505 of FIG. 5A. When the user selects Movie A, laptop computer 210 may display another user interface 570 to the user, as shown in FIG. 5E. User interface 570 may include information associated with Movie A, such as, for example, an image associated with Movie A; a partial description of Movie A (e.g., "This is a comedy about two buddies who bumble their way through life"); an option to read the full description of Movie A; an option to purchase Movie A; an option to add Movie A to the user's bookmarks; an option to preview Movie A; and an option 575 to play Movie A.

Further, assume that the user utilizes laptop computer 210 to select option 575 to play Movie A. When the user selects option 575, laptop computer 210 may retrieve (e.g., from memory) a chunk(s) 555 that is associated with Movie A. As shown in a user interface 580 of FIG. 5F, laptop computer 210 may play chunk(s) 555 associated with Movie A for the user almost immediately (e.g., in less than approximately one second) after laptop computer 210 receives the user's selection of option 575 to play Movie A. Laptop computer 210 may continue to play Movie A via user interface 580, as long as the user has not exceeded the particular number (e.g., of simultaneously playing user devices 210) permitted for the user's account.

As indicated above, FIGS. 5A-5F are provided merely as an example. Other examples are possible and may differ from what was described with regard to FIGS. 5A-5F.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code it being understood that software and control hardware can be designed to implement the systems and/or methods based on the description herein.

A component is intended to be broadly construed as hardware, firmware, or a combination of hardware and software.

As used herein, the term "user" is intended to be broadly interpreted to include a user device, or a user of a user device.

User interfaces, as described herein, may include graphical user interfaces (GUIs) and/or non-graphical user interfaces, such as text-based interfaces. The user interfaces may provide information to users via customized interfaces e.g., proprietary interfaces) and/or other types of interfaces e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a user device (e.g., via a touch screen display, a mouse, a keyboard, a keypad, voice commands, etc.).

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a device, information associated with over-the-top (OTT) content,
      the device being associated with a user, and
      the OTT content being associated with the user;
   retrieving, by the device and from an application server, an address and a playback position associated with the OTT content;
   retrieving, by the device and from the application server, a manifest file associated with the OTT content,
      the manifest file identifying chunks of content associated with the OTT content;
   retrieving, by the device and from a content distribution network (CDN) server, one or more chunks, of the chunks of content associated with the OTT content, based on the address, the playback position, and the manifest file,
      the one or more chunks being fewer than all of the chunks;
   storing, by the device, the one or more chunks in a memory provided in the device;
   receiving, by the device, an instruction to play the OTT content after the one or more chunks are stored;
   retrieving, by the device and based on the instruction, the one or more chunks from the memory provided in the device; and
   playing, by the device and based on the instruction, the one or more chunks while simultaneously retrieving remaining chunks of the OTT content from the CDN server.

2. The method of claim 1, further comprising:
   retrieving, from a license server, a license for the OTT content; and
   storing the license for the OTT content.

3. The method of claim 1, further comprising:
registering the device for the OTT content; and
activating the device for the OTT content.

4. The method of claim 3, where,
when the OTT content is in a particular streaming format:
the device is registered via the application server and a license server, and
the device is activated via the license server.

5. The method of claim 3, where,
when the OTT content is in a particular streaming format:
the device is registered and activated via an authentication token associated with the user.

6. The method of claim 1, where the one or more chunks are played less than approximately one second after receiving the instruction.

7. The method of claim 1, further comprising:
establishing, based on the instruction, a connection to retrieve a location of chunks of particular OTT content in the CDN server,
the connection being previously determined by the CDN server,
receiving another instruction to play the particular OTT content; and
playing the chunks of the particular OTT content based on the established connection and less than approximately one second after receiving the other instruction.

8. A device, comprising:
a memory; and
one or more processors to:
receive information associated with over-the-top (OTT) content,
the device being associated with a user, and
the OTT content being associated with the user,
retrieve, from an OTT content delivery system, an address and a playback position associated with the OTT content,
retrieve, from the OTT content delivery system, a manifest file associated with the OTT content,
the manifest file identifying chunks of content associated with the OTT content,
retrieve, from the OTT content delivery system, one or more chunks, of the chunks of content associated with the OTT content, based on the address, the playback position, and the manifest file,
the one or more chunks being fewer than all of the chunks;
store the one or more chunks in the memory of the device,
receive an instruction to play the OTT content after the one or more chunks are stored,
retrieve, based on the instruction, the one or more chunks from the memory of the device, and
play the one or more chunks, based on the instruction, while simultaneously retrieving remaining chunks of the OTT content from the OTT content delivery system.

9. The device of claim 8, where the one or more processors are further to:
retrieve, from the OTT content delivery system, a license for the OTT content, and
store the license for the OTT content in the memory.

10. The device of claim 8, where the one or more chunks are played less than approximately one second after receiving the instruction.

11. The device of claim 8, where,
when the OTT content is in a particular streaming format:
the device is registered and activated via the OTT content delivery system.

12. The device of claim 8, where,
when the OTT content is in a particular streaming format:
the device is registered and activated via an authentication token associated with the user.

13. The device of claim 8, where the OTT content includes one of:
audio,
video, or
a combination of audio and video.

14. The device of claim 8, where the playback position defines a position of the OTT content last played by the device.

15. A non-transitory computer-readable medium for storing instructions, the instructions comprising:
one or more instructions that, when executed by one or more processors of a device, cause the one or more processors to:
receive information associated with over-the-top (OTT) content,
the device being associated with a user, and
the OTT content being associated with the user,
provide, to an application server, a first request for an address and a playback position associated with the OTT content,
receive, from the application server and based on the first request, the address and the playback position associated with the OTT content,
provide, to the application server, a second request for a manifest file associated with the OTT content,
receive, from the application server and based on the second request, the manifest file associated with the OTT content,
the manifest file identifying chunks of content associated with the OTT content,
provide, to a content distribution network (CDN) server, a third request for one or more chunks of the chunks of content associated with the OTT content,
the third request including the address, the playback position, and the manifest file,
receive, from the CDN server and based on the third request, the one or more chunks,
store the one or more chunks in a memory provided in the device,
receive an instruction to play the OTT content after the one or more chunks are stored,
retrieve, based on the instruction, the one or more chunks from the memory provided in the device, and
play the one or more chunks, based on the instruction, while simultaneously receiving remaining chunks of the OTT content from the CDN server.

16. The computer-readable medium of claim 15, where the instructions further comprise:
one or more instructions that, when executed by the one or more processors, cause the one or more processors to:
provide, to a license server, a fourth request for a license for the OTT content,
receive, from the license server and based on the fourth request, the license for the OTT content, and
store the license for the OTT content.

17. The computer-readable medium of claim 15, where the one or more chunks are played less than approximately one second after receiving the instruction.

18. The computer-readable medium of claim 15, where, when the OTT content is in a particular streaming format, the instructions further comprise:
    one or more instructions that, when executed by the one or more processors, cause the one or more processors to:
        provide, to the application server and a license server, a fourth request to register the device for the OTT content,
        receive, from the application server and the license server, an indication that the device is registered for the OTT content based on the fourth request,
        provide, to the license server, a fifth request to activate the device for the OTT content, and
        receive, from the license server, an indication that the device is activated for the OTT content based on the fifth request.

19. The computer-readable medium of claim 15, where, when the OTT content is in a particular streaming format, the instructions further comprise:
    one or more instructions that, when executed by the one or more processors, cause the one or more processors to:
        register and activate the device via an authentication token associated with the user.

20. The computer-readable medium of claim 15, where the playback position defines a position of the OTT content last played by the device.

* * * * *